(12) United States Patent  
Sato

(10) Patent No.: US 12,120,420 B2  
(45) Date of Patent: Oct. 15, 2024

(54) IMAGING DEVICE, IMAGING METHOD, AND PROGRAM

(71) Applicant: Sony Group Corporation, Tokyo (JP)

(72) Inventor: Takahiro Sato, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/087,119

(22) Filed: Dec. 22, 2022

(65) Prior Publication Data

US 2023/0276120 A1 Aug. 31, 2023

Related U.S. Application Data

(63) Continuation of application No. 17/416,890, filed as application No. PCT/JP2019/048877 on Dec. 13, 2019, now Pat. No. 11,539,892.

(30) Foreign Application Priority Data

Dec. 28, 2018 (JP) .................................. 2018-246877

(51) Int. Cl.
*H04N 23/63* (2023.01)
*G06V 40/10* (2022.01)
(Continued)

(52) U.S. Cl.
CPC .......... *H04N 23/635* (2023.01); *G06V 40/10* (2022.01); *G06V 40/19* (2022.01); *H04N 23/611* (2023.01); *H04N 23/675* (2023.01)

(58) Field of Classification Search
CPC ......... H04N 5/232127; H04N 5/23219; H04N 5/232945; H04N 5/22525; H04N 5/23216; H04N 5/232; H04N 5/23296; H04N 5/23212; H04N 5/23293; H04N 5/23229; H04N 5/23245; H04N 5/232122;
(Continued)

(56) References Cited

U.S. PATENT DOCUMENTS 8,493,494 B2 7/2013 Sakai et al.
8,890,993 B2 * 11/2014 Kunishige ............ H04N 23/635
                                                382/190

(Continued)

FOREIGN PATENT DOCUMENTS

EP        1876812 A1    1/2008
JP      2010-122358 A   6/2010
              (Continued)

OTHER PUBLICATIONS

International Search Report (PCT/ISA/210), International Application No. PCT/JP2019/048877, dated Mar. 3, 2020.

(Continued)

*Primary Examiner* — Pritham D Prabhakher
(74) *Attorney, Agent, or Firm* — Michael Best & Friedrich LLP

(57) ABSTRACT

The present technology relates to an imaging device, an imaging method, and a program that make it possible to easily perform imaging focusing on a subject or a specific part of the subject. The imaging device causes a preliminary-notice frame that gives notice of a specific area to be focused to be displayed on an image obtained by an imaging unit according to a type of the subject. The present technology can be applied to an imaging device.

21 Claims, 14 Drawing Sheets

(51) Int. Cl.
*G06V 40/19* (2022.01)
*H04N 23/611* (2023.01)
*H04N 23/67* (2023.01)

(58) Field of Classification Search
CPC ... G02B 7/34; G02B 7/09; G02B 7/36; G06V 40/10; G06V 40/19; G06V 20/10; G03B 13/36; G03B 7/091; G06F 3/0412; G06T 7/11
See application file for complete search history.

(56) References Cited

U.S. PATENT DOCUMENTS

| | | | |
|---|---|---|---|
| 9,041,844 B2 * | 5/2015 | Wood | H04N 23/635 |
| | | | 348/333.01 |
| 9,521,363 B1 | 12/2016 | Buchheit et al. | |
| 9,824,271 B2 * | 11/2017 | Whritenor | G06T 5/00 |
| 9,912,859 B2 * | 3/2018 | Zhang | H04N 23/635 |
| 10,033,921 B2 * | 7/2018 | Song | H04N 23/61 |
| 10,115,033 B2 * | 10/2018 | Loui | G06F 16/5854 |
| 10,306,131 B2 * | 5/2019 | Yokozeki | H04N 23/611 |
| 10,440,252 B2 * | 10/2019 | Fukuda | H04N 23/611 |
| 10,459,190 B2 | 10/2019 | Suzuki et al. | |
| 10,558,884 B2 * | 2/2020 | Loui | G06F 16/5854 |
| 10,649,313 B2 | 5/2020 | Ota | |
| 10,686,979 B2 * | 6/2020 | Minami | H04N 23/62 |
| 10,958,825 B2 | 3/2021 | Ogawa | |
| 2010/0188560 A1 * | 7/2010 | Sakai | H04N 23/62 |
| | | | 348/E5.042 |
| 2012/0147252 A1 | 6/2012 | Kunishige | |
| 2013/0286269 A1 | 10/2013 | Wood et al. | |
| 2014/0241775 A1 * | 8/2014 | Kawashima | B65H 1/266 |
| | | | 399/367 |
| 2015/0109515 A1 * | 4/2015 | Kobuse | H04N 23/651 |
| | | | 348/349 |
| 2015/0207985 A1 * | 7/2015 | Uemura | H04N 23/632 |
| | | | 348/333.01 |
| 2015/0256737 A1 * | 9/2015 | Saito | H04N 23/672 |
| | | | 348/349 |
| 2015/0379348 A1 * | 12/2015 | Whritenor | G06T 5/00 |
| | | | 382/117 |
| 2016/0241775 A1 | 8/2016 | Fukuda | |
| 2016/0295100 A1 | 10/2016 | Yokozeki et al. | |
| 2017/0118404 A1 | 4/2017 | Song | |
| 2017/0289441 A1 | 10/2017 | Zhang | |
| 2018/0070819 A1 * | 3/2018 | Kanamori | A01K 29/005 |
| 2018/0335930 A1 * | 11/2018 | Scapel | G06V 20/20 |
| 2018/0348470 A1 | 12/2018 | Suzuki et al. | |
| 2019/0011805 A1 | 1/2019 | Ota | |
| 2019/0116318 A1 | 4/2019 | Ogawa | |
| 2019/0182419 A1 * | 6/2019 | Sekiguchi | H04N 25/76 |

FOREIGN PATENT DOCUMENTS

| | | |
|---|---|---|
| JP | 2016-118799 A | 6/2016 |
| JP | 2017-103601 A | 6/2017 |
| JP | 2017-175606 A | 9/2017 |
| JP | 2018-207309 A | 12/2018 |
| WO | 2015/045911 A1 | 4/2015 |

OTHER PUBLICATIONS

Notification of Transmittal of the International Search Report and the Written Opinion of the International Searching Authority, or the Declaration (PCT/ISA/220), International Application No. PCT/JP2019/048877, dated Mar. 17, 2020.
Written Opinion of the International Search Authority (PCT/ISA/237), International Application No. PCT/JP2019/048877, dated Mar. 17, 2020.
Supplementary European Search Report dated Jan. 18, 2022 for corresponding European Application No. 19904199.7.

* cited by examiner

FIG. 8
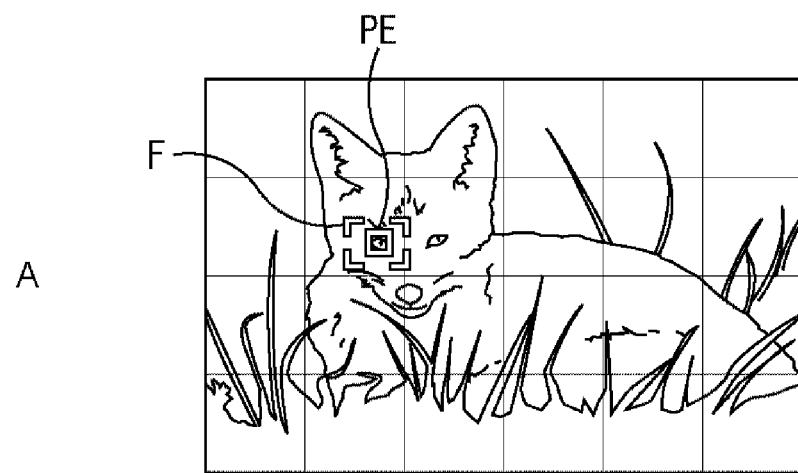

IMAGING DEVICE, IMAGING METHOD, AND PROGRAM

CROSS REFERENCES TO RELATED APPLICATIONS

The present application is a Continuation Application of U.S. patent application Ser. No. 17/416,890 filed Jun. 21, 2021, which is a 371 National Stage Entry of International Application No.: PCT/JP2019/048877, filed on Dec. 13, 2019, which in turn claims priority from Japanese Application No. 2018-246877, filed on Dec. 28, 2018, the entire contents of which are incorporated herein by reference.

TECHNICAL FIELD

The present technology relates to an imaging device, an imaging method, and a program, and more particularly to an imaging device, an imaging method, and a program that make it possible to easily perform imaging focusing on a subject or a specific part of the subject.

BACKGROUND ART

Patent Document 1 proposes an imaging device that detects a pupil area, which is an area of a pupil of a person, and focuses on the detected pupil area.

CITATION LIST

Patent Document

Patent Document 1: International Publication No. 2015/045911

SUMMARY OF THE INVENTION

Problems to be Solved by the Invention

The imaging device disclosed in Patent Document 1 detects only a pupil area of a person, and it has been difficult to detect a pupil area of an animal.

The present technology has been conceived in view of such a situation, and it aims to easily perform imaging focusing on a subject or a specific part of the subject.

Solutions to Problems

An imaging device according to one aspect of the present technology includes a display control unit that causes a preliminary-notice frame that gives notice of a specific area to be focused to be displayed on an image obtained by an imaging unit according to a type of a subject.

According to one aspect of the present technology, a preliminary-notice frame that gives notice of a specific area to be focused is displayed on an image obtained by an imaging unit according to a type of a subject.

BRIEF DESCRIPTION OF DRAWINGS

FIG. 8 is a diagram illustrating a selection method in a case where a plurality of pupils is detected in the animal pupil detection mode.

MODE FOR CARRYING OUT THE INVENTION

Hereinafter, an embodiment for implementing the present technology will be described. Descriptions will be given in the following order.

1. Present technology overview
2. Exemplary configuration of imaging device
3. Selection method in a case where multiple pupils are detected
4. Exemplary operation of imaging device <1. Present Technology Overview>

An imaging device according to an embodiment of the present technology has a detection mode for each specific part, which detects an area of a specific part of a subject and uses the detected area of the specific part for focusing. Examples of the detection mode for each specific part include a human pupil detection mode and an animal pupil detection mode.

Figure 1:
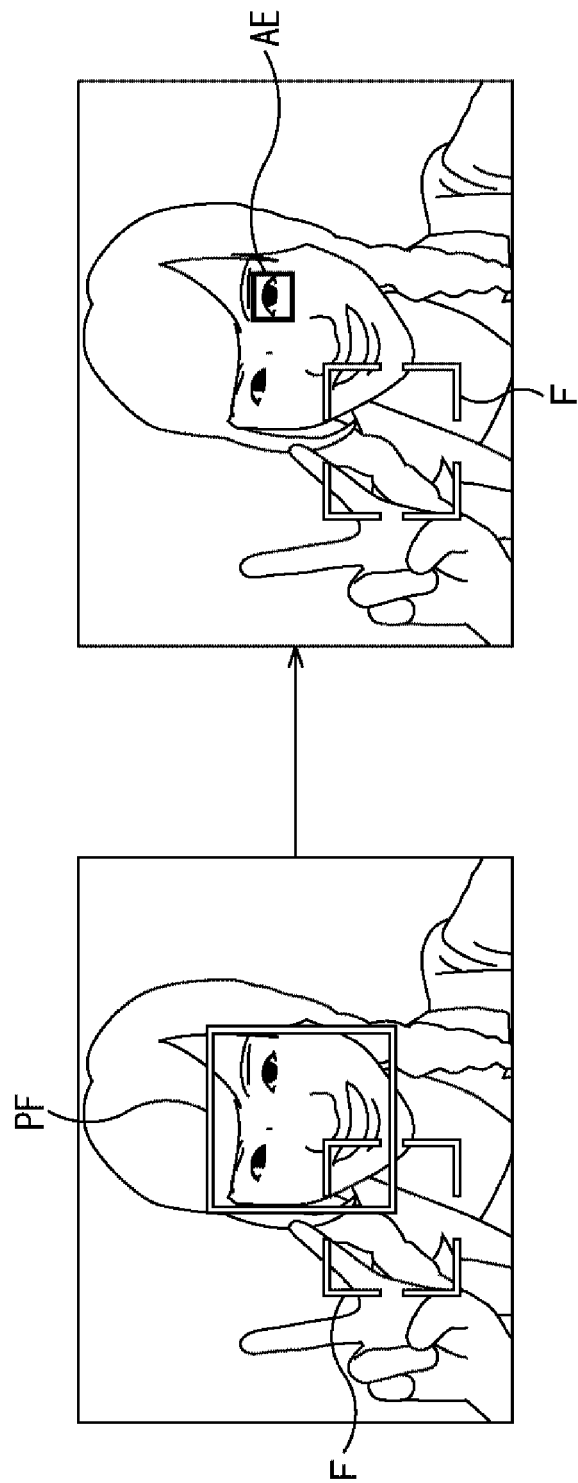
FIG. 1 is a diagram illustrating an exemplary process of detecting a pupil of a person.

FIG. 1 is a diagram illustrating an exemplary process of detecting a pupil of a person.

FIG. 1 illustrates a screen displayed on a display unit of the imaging device in a case where the human pupil detection mode is set. The screen on the left side in FIG. 1 is a screen displayed before an operation for instructing a start of focusing is performed by a user. The screen on the right side is a screen displayed after the operation for instructing a start of focusing is performed by the user. Note that a face of a person is displayed on the screen.

In a case where the human pupil detection mode is set, as illustrated on the left side in FIG. 1, a face area that overlaps a focus frame F is detected among the face areas that are areas of faces, and a face preliminary-notice frame PF that gives notice of the detected face area is displayed. In the example on the left side in FIG. 1, the face preliminary-notice frame PF is displayed to partially overlap the focus frame F. The focus frame F is a focus setting frame for setting a focus.

In a case where the user performs the operation for instructing a start of focusing in this state, as illustrated on the right side in FIG. 1, detection of a pupil area, which is an area of a pupil, is performed on the face area, and a pupil frame AE indicating the detected pupil area is displayed in place of the face preliminary-notice frame PF. Furthermore, focusing is performed on the pupil area surrounded by the pupil frame AE.

Figure 2:
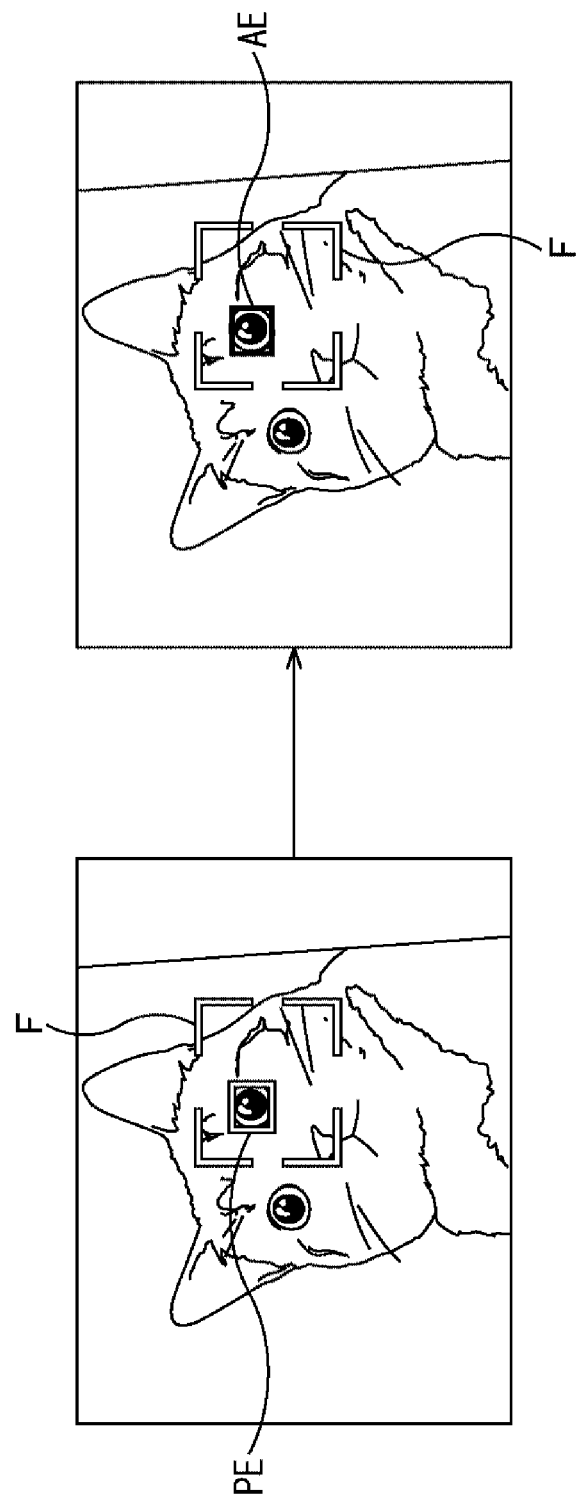
FIG. 2 is a diagram illustrating an exemplary process of detecting a pupil of an animal.

FIG. 2 is a diagram illustrating an exemplary process of detecting a pupil of an animal.

FIG. 2 illustrates a screen displayed on the display unit of the imaging device in a case where the animal pupil detection mode is set. The screen on the left side in FIG. 2 is a screen displayed before the operation for instructing a start of focusing is performed by the user. The screen on the right side is a screen displayed after the operation for instructing a start of focusing is performed by the user. Note that a face of an animal (cat) is displayed on the screen.

In a case where the animal pupil detection mode is set, as illustrated on the left side in FIG. 2, detection of the pupil area is performed on the inside and outside of the focus frame F, and a pupil preliminary-notice frame PE that gives notice of the detected pupil area is displayed. Note that, at this time, the detection of the pupil area is performed with priority given to the inside of the focus frame F.

In a case where the operation for instructing a start of focusing is performed by the user in this state, as illustrated on the right side in FIG. 2, the pupil frame AE indicating the pupil area is displayed in the pupil area in place of the pupil preliminary-notice frame PE. Furthermore, focusing is performed on the pupil area surrounded by the pupil frame AE.

For example, the pupil frame AE is displayed according to a display method different from the pupil preliminary-notice frame PE such as the pupil preliminary-notice frame PE is displayed as a white frame and the pupil frame AE is displayed as a green frame. Note that the face preliminary-notice frame PF and the pupil frame AE are displayed in a similar manner.

As described above, in a case where the human pupil detection mode is set, a face area is detected and the face preliminary-notice frame PF is displayed in the detected face area before the operation for instructing a start of focusing is performed by the user.

Meanwhile, in a case where the animal pupil detection mode is set, a pupil area is detected and the pupil preliminary-notice frame PE is displayed in the detected pupil area before the operation for instructing a start of focusing is performed by the user.

With the preliminary-notice frame displayed before the user performs the operation for instructing a start of focusing, it is known in advance that the intended position or an unintended position has been detected, whereby the user is enabled to select not performing automatic focusing. This makes it possible to easily perform imaging focusing on a specific part of the subject.

Figure 3:
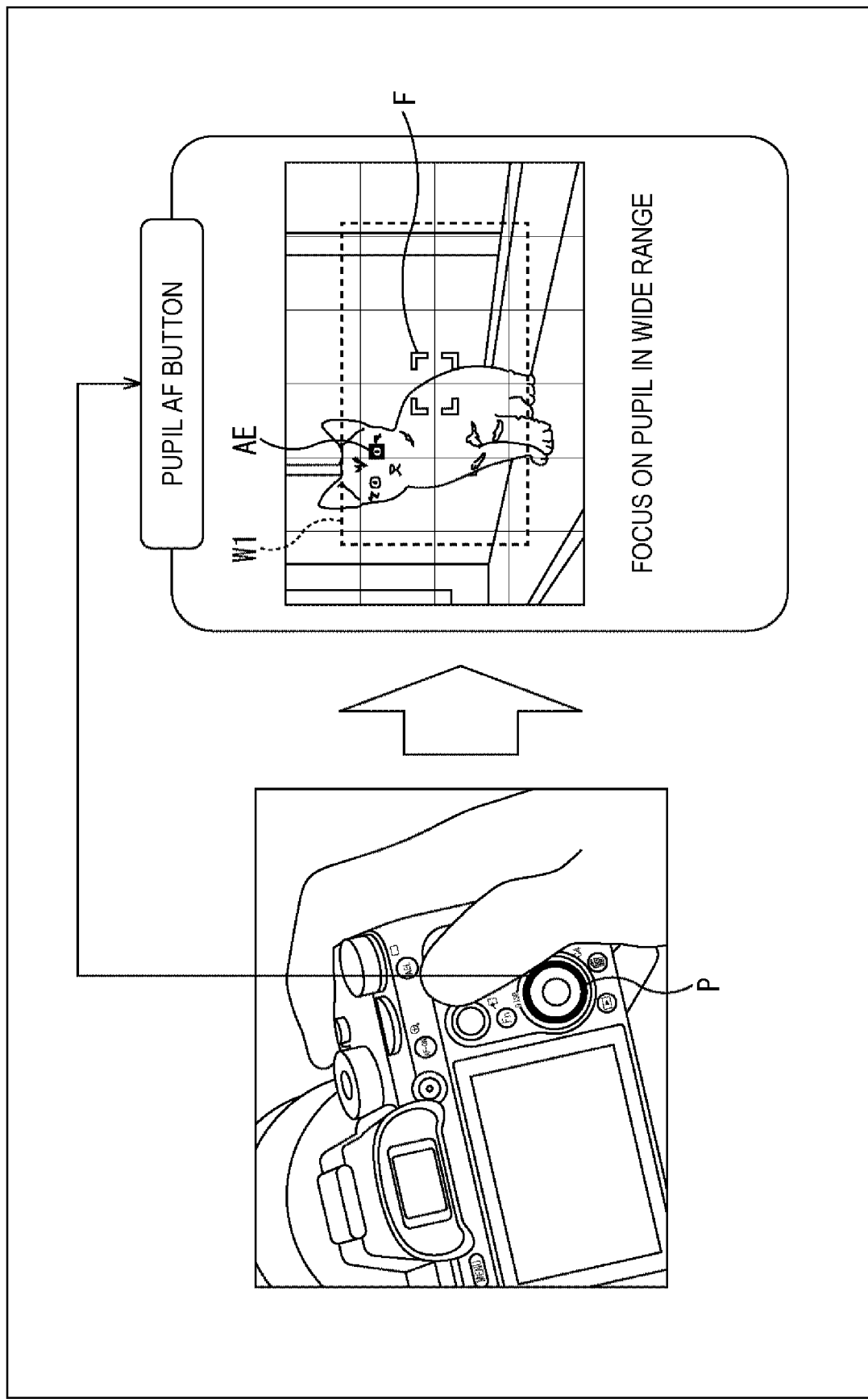
FIG. 3 is a diagram illustrating a method of instructing a start of focusing in the case of an animal pupil detection mode.
Figure 4:
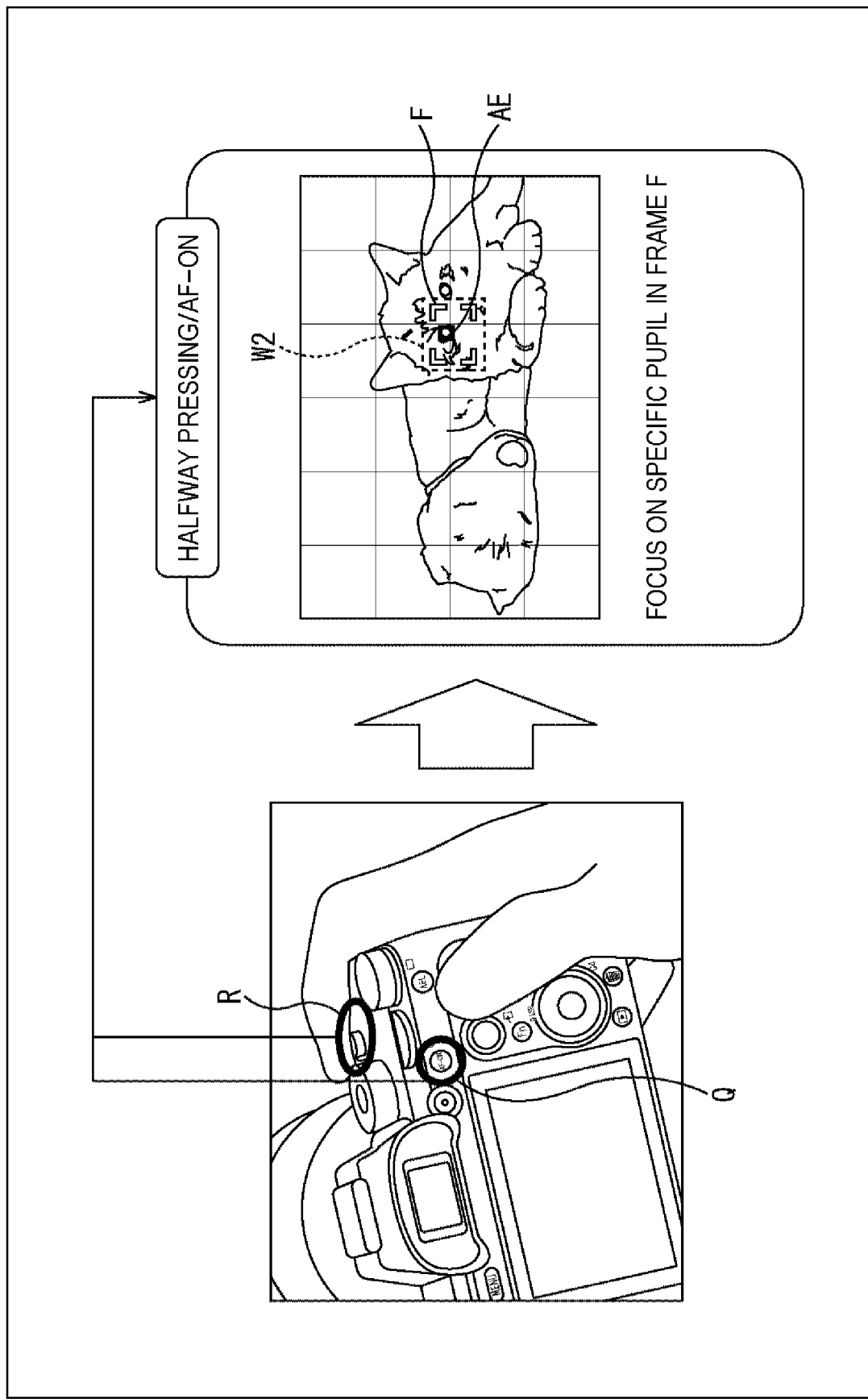
FIG. 4 is a diagram illustrating a method of instructing a start of focusing in the case of the animal pupil detection mode.

FIGS. 3 and 4 are diagrams illustrating a method of instructing a start of focusing in a case where the animal pupil detection mode is set.

With the imaging device, the user can make an instruction for a focusing start by pressing a pupil autofocus (AF) button P, pressing an AF-ON button Q, pressing a shutter button R halfway, or the like.

As illustrated on the left side in FIG. 3, the pupil AF button P is configured as, for example, a center button located at the center of a cross button provided on the back surface of the imaging device. The pupil AF button P is a dedicated button for instructing a start of focusing on the pupil, which is a specific part of the subject.

As described above, the pupil preliminary-notice frame is displayed in the detected pupil area in the image of the subject on the display unit of the imaging device before the operation for instructing a start of focusing is performed by the user.

In a case where the user presses the pupil AF button P in this state, the display unit displays a screen as illustrated on the right side in FIG. 3.

As illustrated on the right side in FIG. 3, the focus frame F and the pupil frame AE are displayed on the screen in a manner of overlapping the image in which a cat is facing the front. On the right side in FIG. 3, the focus frame F is displayed at the center of the screen, which is around the back of the cat.

In a case where the user presses the pupil AF button P, a range up to approximately 50% of the screen is set as a detection range W1 of the pupil area with reference to the center of the focus frame F. Note that the detection range W1 is not displayed in actuality. Note that the focus frame F itself may be set in a wide range like the detection range W1.

When the pupil area is detected in the detection range W1 in a case where the user presses the pupil AF button P, the pupil frame AE is displayed in the pupil area in place of the pupil preliminary-notice frame having been displayed before the pressing of the pupil AF button P.

Furthermore, as illustrated on the left side in FIG. 4, the AF-ON button Q is provided on the upper side of the back surface of the imaging device, for example. The AF-ON button Q is a button for instructing a start of focusing on the pupil in the focus frame F.

As illustrated on the left side in FIG. 4, the shutter button R is provided on the upper surface of the imaging device, for example. In a similar manner to the AF-ON button Q, the shutter button R is a button for instructing a start of focusing on the pupil in the focus frame F in the case of being pressed halfway by the user, and is a button for instructing a shutter in the case of being pressed fully by the user.

As described above, the pupil preliminary-notice frame is displayed in the detected pupil area in the image of the subject on the display unit of the imaging device before the operation for instructing a start of focusing is performed by the user.

In a case where the user presses the AF-ON button Q in this state, or in a case where the user presses the shutter button R halfway, a screen as illustrated on the right side in FIG. 4 is displayed on the display unit.

As illustrated on the right side in FIG. 4, the focus frame F and the pupil frame AE are displayed on the screen in a manner of overlapping the image in which a dog is sleeping next to the cat. On the right side in FIG. 4, the focus frame F is displayed on the left pupil of the cat.

In a case where the user presses the AF-ON button Q, a range from the center of the focus frame F to the vicinity of the focus frame F is set as a detection range W2 of the pupil area. Note that the detection range W2 is not displayed in actuality.

When the pupil area is detected in the detection range W2 in a case where the user presses the AF-ON button Q, the pupil frame AE is displayed in the pupil area in place of the pupil preliminary-notice frame having been displayed before the pressing of the AF-ON button Q.

As described above, in the case of the animal pupil detection mode, the pupil preliminary-notice frame that gives notice of the pupil area is displayed in the imaging device before the operation for instructing a start of focusing is performed by the user. When the user performs the operation for instructing a start of focusing, the pupil frame AE indicating the pupil area is displayed, and the focusing is performed on the pupil area.

Therefore, it becomes possible to promptly grasp the position of the animal pupil in the image. As a result, the user can easily perform imaging focusing on the pupil of the animal.

Note that the position at which each button is provided on the imaging device is not limited to the position illustrated in FIGS. 3 and 4, and may be another position.

Furthermore, although an exemplary case of detecting a pupil as a specific part of the subject has been described above, the subject itself may be detected in a case where the subject is a small animal such as a bird.

<2. Exemplary Configuration of Imaging Device>

Figure 5:
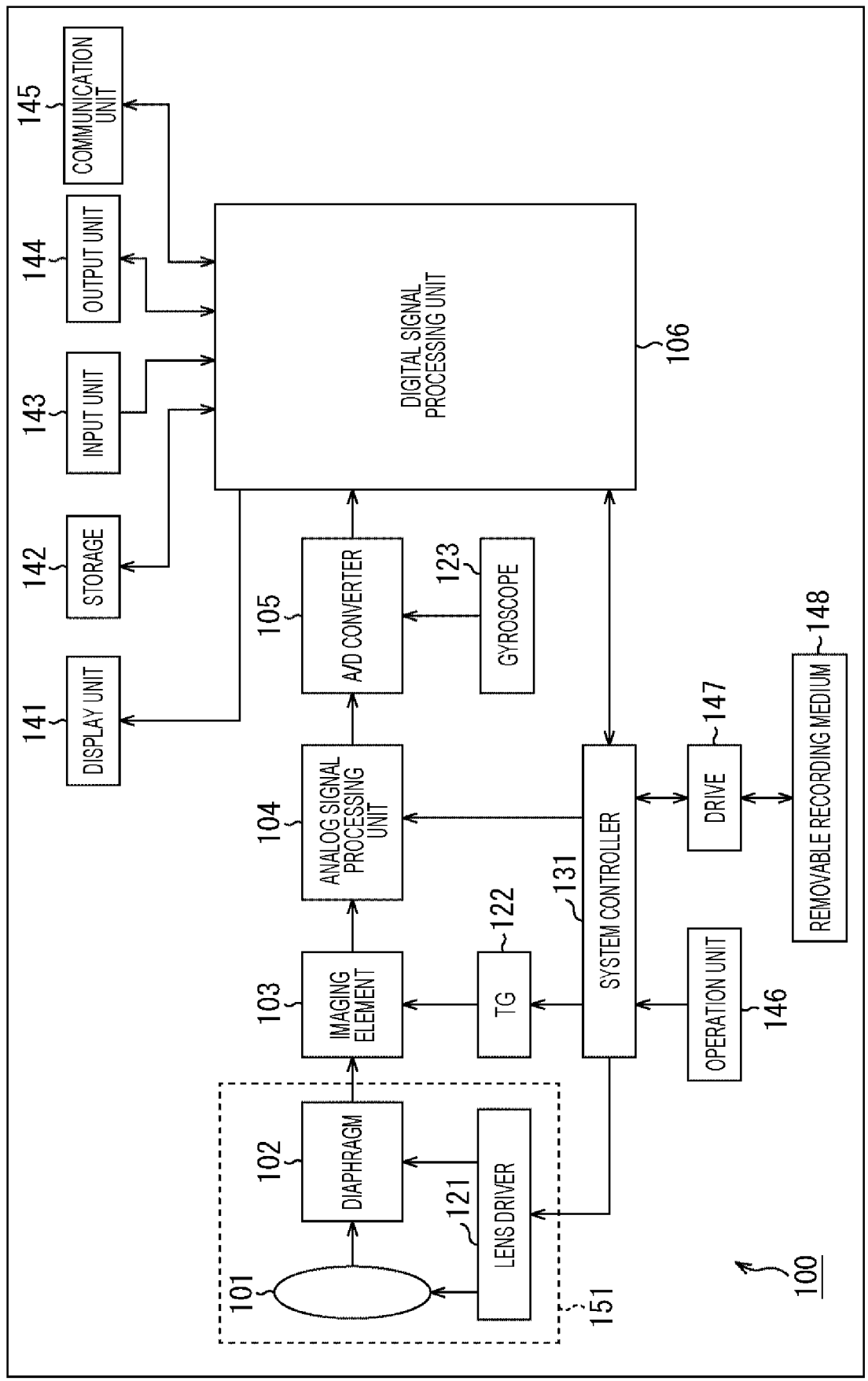
FIG. 5 is a block diagram illustrating an exemplary main configuration of an imaging device to which the present technology is applied.

FIG. 5 is a block diagram illustrating an exemplary main configuration of the imaging device.

An imaging device 100 illustrated in FIG. 5 has a detection mode for each specific part of the subject, which includes the human pupil detection mode and the animal pupil detection mode. Note that a detection mode according to a specific part can be provided in the imaging device 100, not limited to a pupil of a person or a pupil of an animal. The user can select and set a desired mode from each detection mode for the subject or a specific part of the subject.

As illustrated in FIG. 5, the imaging device 100 includes a lens 101, a diaphragm 102, an imaging element 103, an analog signal processing unit 104, an analog/digital (A/D) converter 105, and a digital signal processing unit 106. The imaging device 100 includes a lens driver 121, a timing generator (TG) 122, a gyroscope 123, and a system controller 131.

Furthermore, the imaging device 100 includes a display unit 141, a storage 142, an input unit 143, an output unit 144, a communication unit 145, an operation unit 146, and a drive 147.

The lens 101 adjusts a focus to the subject, and collects the light from the focused position. The diaphragm 102 adjusts exposure.

The imaging element 103 images the subject to obtain a captured image. That is, the imaging element 103 photoelectrically converts the light from the subject to output it to, as image signals, the analog signal processing unit 104. On the basis of such photoelectric conversion, the imaging element 103 may capture a still image, or may capture a moving image.

The analog signal processing unit 104 performs analog signal processing on the image signals obtained by the imaging element 103. The A/D converter 105 performs A/D conversion on the image signals having been subject to the analog signal processing to obtain image data that are digital signals.

The digital signal processing unit 106 performs digital signal processing on the image data obtained by the A/D converter 105. As the digital signal processing, the digital signal processing unit 106 at least detects an area of the subject or a specific part of the subject from the moving image supplied as the image data, and performs processing such as setting a focus area. Hereinafter, a specific part of the subject will be simply referred to as a specific part.

Furthermore, the digital signal processing unit 106 also performs processing for controlling display of a frame or the like indicating the area of the subject or the specific part on the basis of the detection result of the area of the subject or the specific part. Details of those processes will be described later.

Note that the contents of the digital signal processing are optional, and processing other than the above may be performed. For example, the digital signal processing unit 106 may perform, as the digital signal processing, color mixture correction, black level correction, white balance adjustment, demosaic processing, matrix processing, gamma correction, YC conversion, and the like. Furthermore, the digital signal processing unit 106 may perform codec processing, which is processing associated with encoding and decoding of image data, as the digital signal processing.

The lens driver 121 drives the lens 101 and the diaphragm 102, and controls a focal length, exposure, and the like. The TG 122 generates and supplies synchronization signals to the imaging element 103 to drive the imaging element 103, and controls imaging. The gyroscope 123 is a sensor that detects a position and an attitude of the imaging device 100. The gyroscope 123 outputs detected sensor information to the A/D converter 105.

The system controller 131 includes, for example, a central processing unit (CPU), a read only memory (ROM), a random access memory (RAM), and the like, and controls each processing unit of the imaging device 100 by executing a program or processing data. Furthermore, on the basis of signals supplied from the operation unit 146, the system controller 131 receives operation input made by the user, and performs processing or control corresponding to the operation input.

For example, the system controller 131 can control the focal length, exposure, and the like on the basis of, for example, the detection result of the area of the subject or the specific part supplied from the digital signal processing unit 106.

The display unit 141 is configured as, for example, a liquid crystal display or the like, and displays an image corresponding to the image data stored in the memory of the digital signal processing unit 106. For example, the display unit 141 can display a taken image obtained by the imaging element 103, a saved captured image, and the like.

The storage 142 stores image data stored in the memory of the digital signal processing unit 106. At that time, the storage 142 stores coded data coded by the digital signal processing unit 106 to reduce the data volume. The coded data stored in the storage 142 is read out and decoded by the digital signal processing unit 106, and is displayed on the display unit 141, for example.

The input unit 143 includes an external input interface such as an external input terminal, and outputs, to the digital signal processing unit 106, various kinds of data (e.g., image data and coded data) supplied from the outside of the imaging device 100 via the external input interface.

The output unit 144 includes an external output interface such as an external output terminal, and outputs various kinds of data supplied via the digital signal processing unit 106 to the outside of the imaging device 100 via the external output interface.

The communication unit 145 performs, with another device, predetermined communication that is at least one of wired communication or wireless communication, and exchanges data with the another device through the predetermined communication. For example, the communication unit 145 outputs various kinds of data (e.g., image data and coded data) supplied from the digital signal processing unit 106 to the another device through the predetermined communication. Furthermore, the communication unit 145 obtains various kinds of data from the another device through the predetermined communication, and outputs the obtained data to the digital signal processing unit 106.

The operation unit 146 includes an optional input device such as a key, a button, or a touch panel, for example. The operation unit 146 includes the pupil AF button P, the AF-ON button Q, or the shutter button R described above with reference to FIG. 3 or 4. The operation unit 146 receives operation input made by the user, and outputs signals corresponding to the operation input to the system controller 131.

The drive 147 reads out information (programs, data, etc.) stored in a removable recording medium 148 such as a semiconductor memory, which is attached to the drive itself, for example. The drive 147 supplies the information read from the removable recording medium 148 to the system controller 131. Furthermore, in a case where a writable removable recording medium 148 is attached to the drive 147, the drive 147 can cause the removable recording medium 148 to store the information (image data, coded data, etc.) supplied via the system controller 131.

Note that the lens 101, the diaphragm 102, and the lens driver 121 described above may be formed as an interchangeable lens 151 that is detachable (replaceable) from the imaging device 100 and has a housing separate from the imaging device 100.

Figure 6:
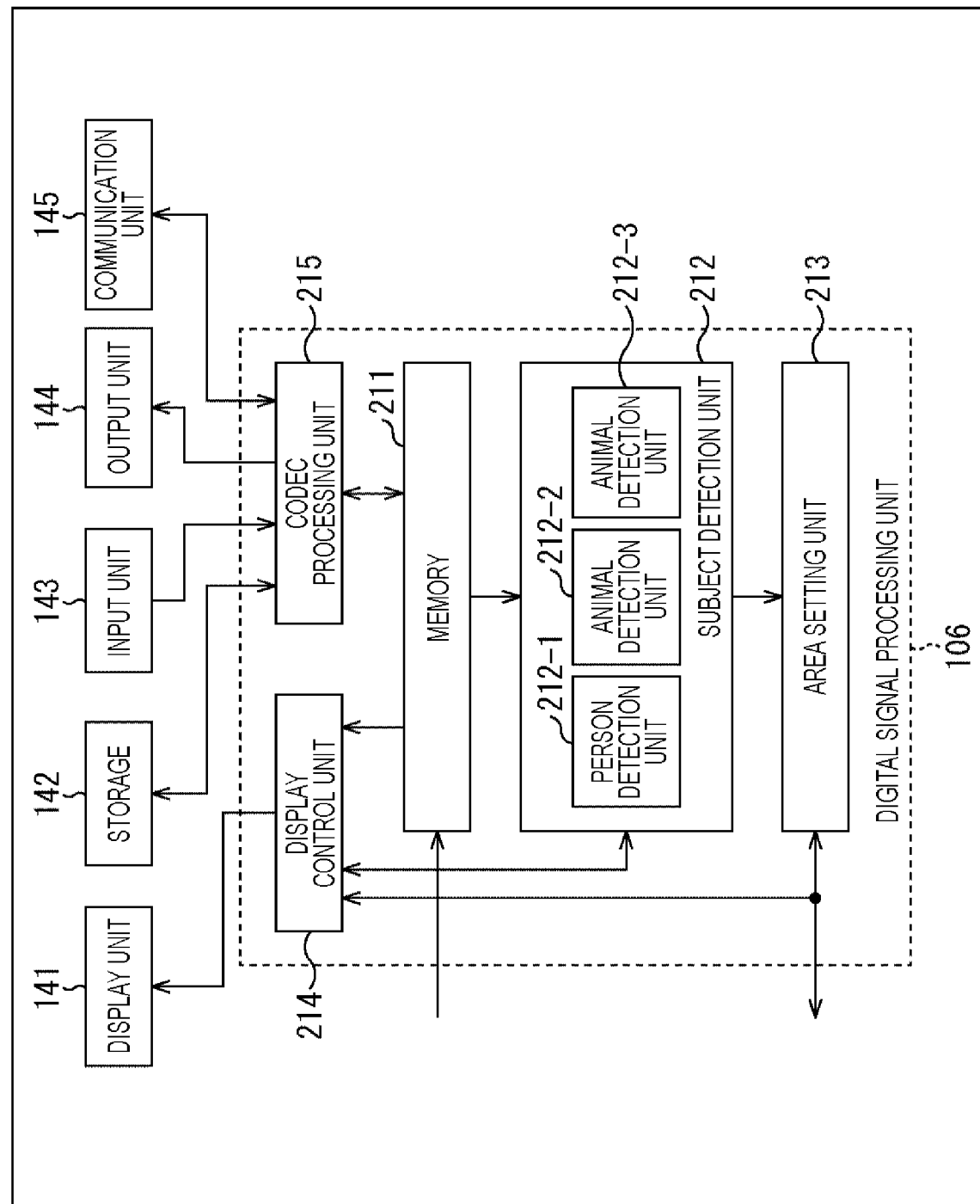
FIG. 6 is a block diagram illustrating an exemplary configuration of a digital signal processing unit.

FIG. 6 is a block diagram illustrating an exemplary configuration of the digital signal processing unit 106.

The digital signal processing unit 106 includes a memory 211, a subject detection unit 212, an area setting unit 213, a display control unit 214, and a codec processing unit 215.

The memory 211 stores image data supplied from the A/D converter 105. The image data is, for example, image data of each frame of a moving image or image data of a still image.

The subject detection unit 212 detects an area of a subject or a specific part from image data stored in the memory 211 on the basis of the signals corresponding to the operation input made by the user, which are supplied from the system controller 131. The subject detection unit 212 outputs a detection result of the area of the subject or the specific part to the area setting unit 213 and the display control unit 214.

The subject detection unit 212 includes a person detection unit 212-1, an animal detection unit 212-2, and an animal detection unit 212-3.

In a case where a detection mode for each specific part of the subject is the human pupil detection mode, the person detection unit 212-1 detects a face area of a person, and outputs a detection result of the detected face area to the area setting unit 213 and the display control unit 214. In a case where an operation for instructing a start of focusing is performed by the user, the person detection unit 212-1 detects a pupil area of the person on the basis of the detection result of the face area, and outputs a detection result of the pupil area to the area setting unit 213 and the display control unit 214.

The animal detection units 212-2 and 212-3 differ in the type of animal to be detected. In a case where a detection mode for each specific part of the subject is the animal pupil detection mode, the animal detection units 212-2 and 212-3 detect a pupil area of a target animal, and output a detection result of the detected pupil area of the animal to the area setting unit 213 and the display control unit 214.

Techniques such as deep learning are used to detect a pupil of an animal, for example. In a case where an operation for instructing a start of focusing is performed by the user, the animal detection units 212-2 and 212-3 detect a pupil of an animal according to a focus frame, and outputs a detection result of the detected pupil area of the animal to the area setting unit 213 and the display control unit 214.

For example, the animal detection unit 212-2 detects a pupil area of an animal such as a dog or a cat. The animal detection unit 212-3 detects a pupil area of an animal such as a lizard or a frog. Another animal detection unit may be provided depending on a type of the animal having the same characteristics at the time of detection, for example, not limited to only the animal detection units 212-2 and 212-3.

Depending on the detection mode for each specific part of the subject, the area setting unit 213 sets, as a focus area, either the area of the specific part of the subject detected by the subject detection unit 212 or the area indicated by the focus frame. The area setting unit 213 supplies information associated with the set focus area to the system controller 131.

According to the signals corresponding to the operation input made by the user, which are supplied from the system controller 131, the display control unit 214 generates a focus frame to cause the display unit 141 to superimpose and display it on the image from the memory 211. The information associated with the focus frame is output to the subject detection unit 212.

Furthermore, the display control unit 214 generates a predetermined frame (face frame, preliminary-notice frame, or pupil frame) according to the face or pupil area detected by the subject detection unit 212 on the basis of the signals corresponding to the operation input made by the user, which are supplied from the system controller 131. The display control unit 214 superimposes the generated predetermined frame on the image from the memory 211, and causes the display unit 141 to display it. Information associated with the face frame, the preliminary-notice frame, or the pupil frame is output to the subject detection unit 212 as necessary.

Note that the display control unit 214 generates an image of a graphical user interface (GUI) such as a menu, a button, or a cursor, and displays it together with a taken image, a captured image, or the like.

The codec processing unit 215 performs processing related to encoding and decoding of image data of moving images or still images stored in the memory 211.

<3. Selection Method in a Case where Multiple Pupils are Detected>

Figure 7:
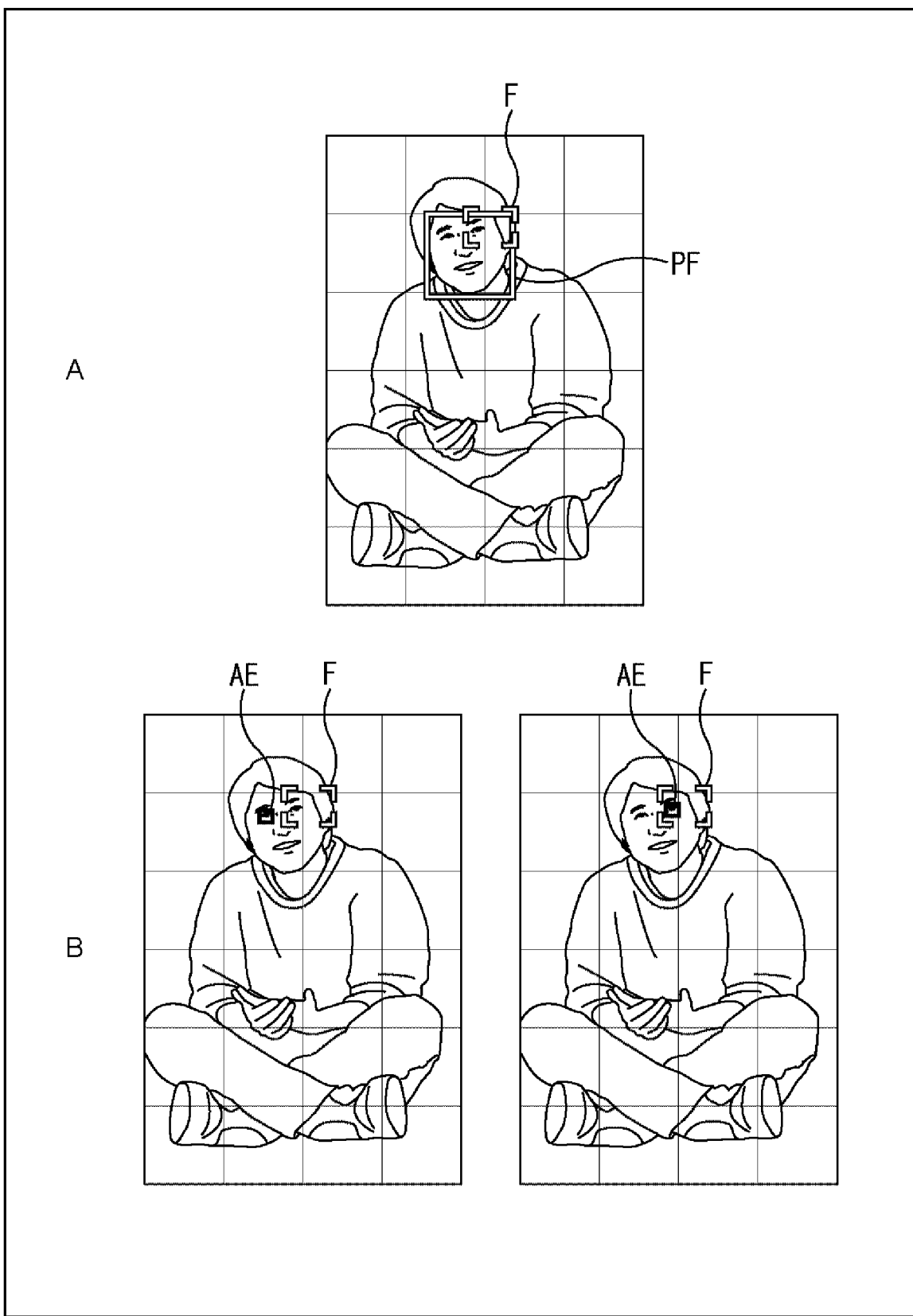
FIG. 7 is a diagram illustrating a selection method in a case where a plurality of pupils is detected in a human pupil detection mode.

FIG. 7 is a diagram illustrating a selection method in a case where a plurality of pupils is detected in the human pupil detection mode.

A screen displayed before the user performs an operation for instructing a start of focusing is illustrated in A of FIG. 7. A screen displayed after the user performs the operation for instructing a start of focusing is illustrated in B of FIG. 7.

In a case where the human pupil detection mode is set, as illustrated in A of FIG. 7, a face area that overlaps the focus frame F is detected among the face areas, and a face preliminary-notice frame PF indicating the detected face area is displayed.

In a case where the user performs the operation for instructing a start of focusing in this state, as illustrated in B of FIG. 7, detection of a pupil area is performed on the face area, and a pupil frame AE indicating the detected pupil area is displayed. Furthermore, focusing is performed on the pupil area surrounded by the pupil frame AE.

At this time, in the detected face area, the pupil area located on the near side of the imaging device 100 is detected. Therefore, in a case where the left pupil is located on the near side of the imaging device 100, the pupil frame AE is displayed on the left pupil even if the user sets the focus frame F on the right pupil, as illustrated on the left side in B of FIG. 7. Furthermore, in a case where the right pupil is located on the near side of the imaging device 100, the pupil frame AE is displayed on the right pupil even if the user sets or does not set the focus frame F on the right pupil, as illustrated on the right side in B of FIG. 7.

In this manner, in the human pupil detection mode, the user simply selects a face to focus on the front pupil in the selected face area, regardless of the position of the focus frame F.

FIG. 8 is a diagram illustrating a selection method in a case where a plurality of pupils is detected in the animal pupil detection mode.

A screen displayed before the user performs an operation for instructing a start of focusing is illustrated in A of FIG. 8. A screen displayed after the user performs the operation for instructing a start of focusing is illustrated in B of FIG. 8.

In a case where the animal pupil detection mode is set, as illustrated in A of FIG. 8, detection of a pupil area is performed on the inside and outside of the focus frame F, and the pupil preliminary-notice frame PE that gives notice of the detected pupil area is displayed. Note that, at this time, the detection of the pupil area is performed with priority given to the inside of the focus frame F.

However, in a case where a plurality of pupil areas is detected, the pupil preliminary-notice frame PE is displayed in the pupil area located on the near side of the imaging device 100 and closer to the center (center position) of the focus frame F. Note that details of the selection of the pupil area will be described later with reference to FIG. 9.

In a case where the user performs the operation for instructing a start of focusing, as illustrated in B of FIG. 8, the pupil frame AE is displayed in the selected pupil area, and focusing is performed on the pupil area indicated by the pupil frame AE.

Note that it is also possible to set the pupil preliminary-notice frame PE not to be displayed. In this case, it becomes possible to suppress hiding of a facial expression of the subject caused by the display of the pupil preliminary-notice frame PE.

Figure 9:
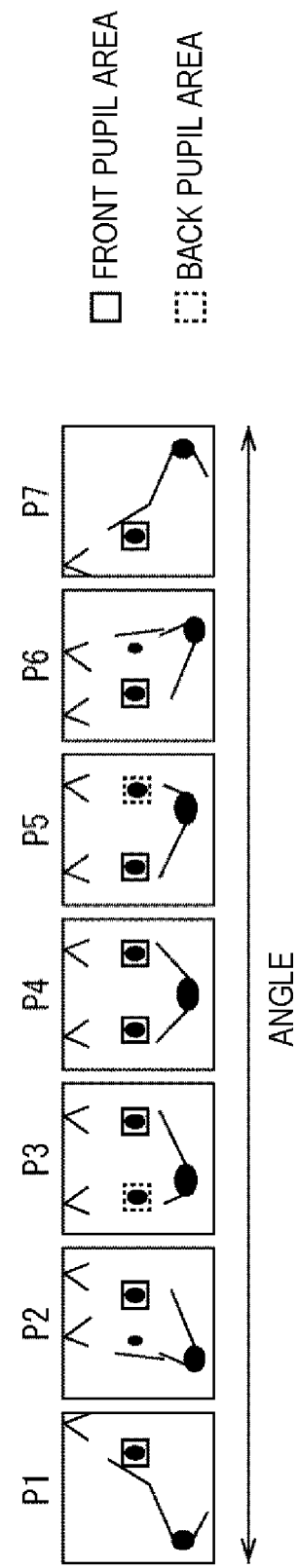
FIG. 9 is a diagram illustrating a relationship between the orientation of a face of a subject and the number of detected pupil areas.

FIG. 9 is a diagram illustrating a relationship between the orientation of a face of a subject and the number of pupil areas.

FIG. 9 illustrates images P1 to P7 with a fox as a subject. The foxes appearing in the images P1 to P7 have different face orientations (angles). A rectangle of a solid line indicates a front pupil area detected in each image, and a rectangle of a broken line indicates a back pupil area detected in each image.

The image P1 shows a fox facing to the left. The image P2 shows a fox facing to the diagonally forward left. The image P3 shows a fox facing to the slightly diagonally forward left. The image P4 shows a fox facing forward. The image P5 shows a fox facing to the slightly diagonally forward right. The image P6 shows a fox facing to the diagonally forward right. The image P7 shows a fox facing to the right.

Of those images, each of the images P1, P2, P6, and P7, which shows a fox facing diagonally forward or sideways (right and left), indicates a case where only a pupil area located on the near side of the imaging device 100 is detected.

In each of the images P3 and P5, which shows a fox facing slightly diagonally forward, two pupil areas are detected, and it is easy to determine which one of the pupil areas is located on the near side of the imaging device 100 and the other pupil area is located on the far side.

In the image P4, which shows a fox facing forward, it is difficult to determine which of the left pupil area and the right pupil area is located on the near side. In this case, as described above, a preliminary-notice frame or a pupil frame is displayed in the pupil area located on the near side of the imaging device 100 and closer to the center of the focus frame.

<4. Exemplary Operation of Imaging Device>

Figure 10:
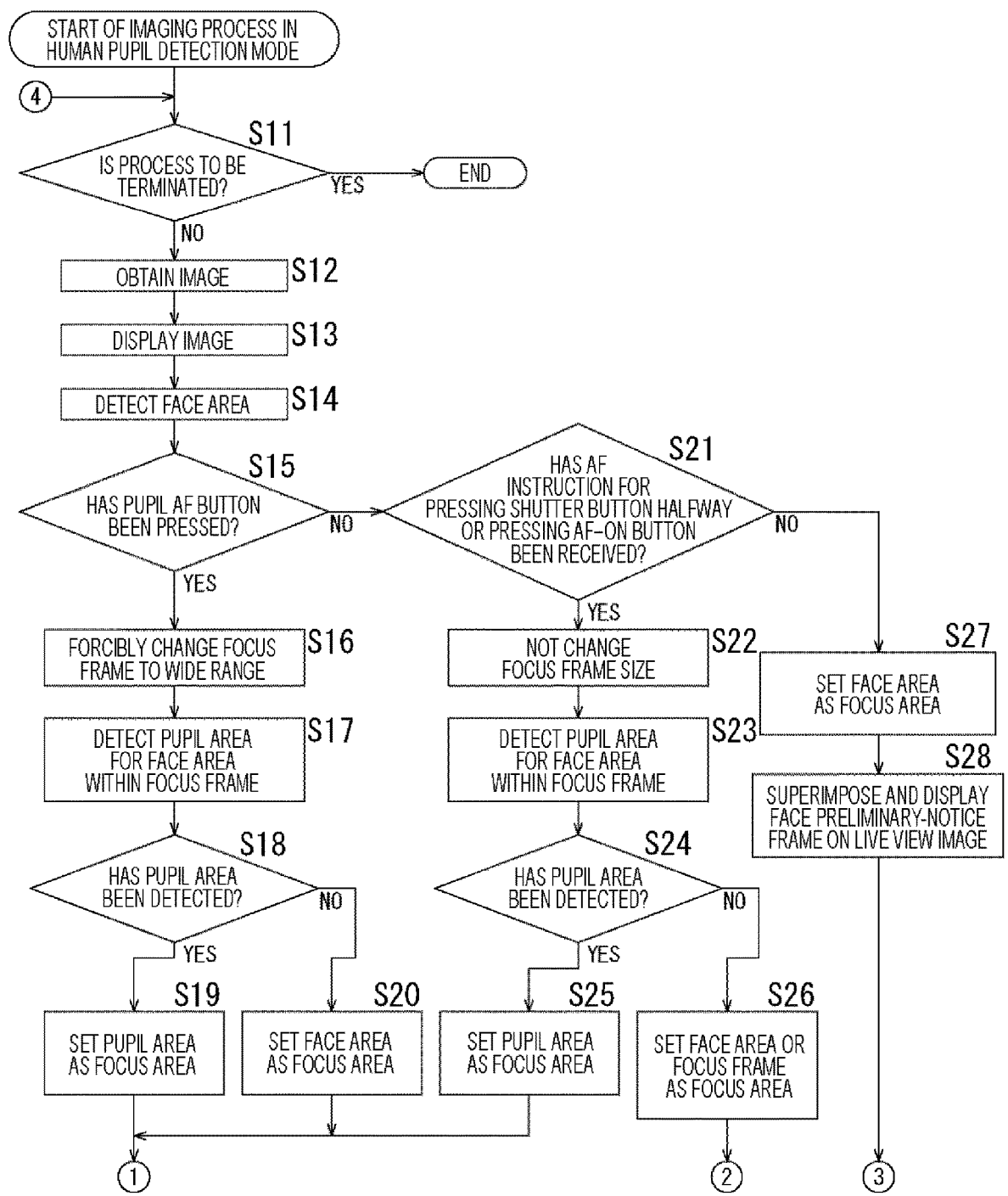
FIG. 10 is a flowchart illustrating an imaging process in the human pupil detection mode.

FIG. 10 is a flowchart illustrating an imaging process of the imaging device 100 in the human pupil detection mode.

The imaging process in the human pupil detection mode of FIG. 10 starts when the power is turned on by a power button being operated, for example. A detection mode for each specific part of the subject is set in advance as a human pupil detection mode from a setting screen or the like.

In step S11 of FIG. 10, the system controller 131 determines whether or not to terminate the process, for example, whether or not the power button has been operated.

In a case where the process is determined to be terminated in step S11, the imaging process is terminated.

In a case where the process is determined not to be terminated in step S11, the process proceeds to step S12.

In step S12, the imaging element 103 photoelectrically converts the light from the subject collected through the lens 101 and the diaphragm 102 in pixel units to obtain an electric signal of each pixel of the image. An image signal, which is an electric signal of each pixel of the image, is output to the memory 211 of the digital signal processing unit 106 via the analog signal processing unit 104 and the A/D converter 105.

In step S13, the display control unit 214 causes the display unit 141 to display an image based on the image data stored in the memory 211 as a live view image.

In step S14, the person detection unit 212-1 detects a face area from the image data stored in the memory 211. The person detection unit 212-1 supplies information associated with the detected face area to the area setting unit 213 and the display control unit 214.

The user provides an instruction for starting focusing by performing an operation such as pressing the pupil AF button, pressing the AF-ON button, or pressing the shutter button halfway. Note that the instruction for starting focusing is provided for each image capturing unit. The operation unit 146 receives operation input made by the user, and outputs signals corresponding to the operation input to the system controller 131.

In step S15, the system controller 131 determines whether or not the user has pressed the pupil AF button. In a case where the pupil AF button is determined to have been pressed in step S15, the process proceeds to step S16.

In step S16, the system controller 131 forcibly changes the focus frame to a wide range.

In step S17, the person detection unit 212-1 detects a pupil area with respect to the face area in the focus frame under the control of the system controller 131. Information associated with the detected pupil area is output to the area setting unit 213 and the display control unit 214.

In step S18, the area setting unit 213 determines whether or not the pupil area has been detected. In a case where the pupil area is determined to have been detected in step S18, the process proceeds to step S19.

In step S19, the area setting unit 213 sets the pupil area detected by the person detection unit 212-1 as a focus area. Information associated with the set focus area is supplied to the system controller 131.

In a case where the pupil area is determined not to have been detected in step S18, the process proceeds to step S20.

In step S20, the area setting unit 213 sets the face area detected by the person detection unit 212-1 as a focus area. Information associated with the set focus area is output to the system controller 131.

Meanwhile, in a case where the pupil AF button is determined not to have been pressed in step S15, the process proceeds to step S21.

In step S21, the system controller 131 determines whether or not the user has pressed the shutter button halfway or whether or not the user has pressed the AF-ON button.

In a case where it is determined in step S21 that the shutter button has been pressed halfway or the AF-ON button has been pressed, the process proceeds to step S22.

In step S22, the system controller 131 does not change the focus frame.

In step S23, the person detection unit 212-1 detects a pupil area with respect to the face area in the focus frame under the control of the system controller 131. Information associated with the detected pupil area is output to the area setting unit 213 and the display control unit 214.

In step S24, the area setting unit 213 determines whether or not the pupil area has been detected. In a case where the pupil area is determined to have been detected in step S24, the process proceeds to step S25.

In step S25, the area setting unit 213 sets the pupil area detected by the person detection unit 212-1 as a focus area. Information associated with the set focus area is supplied to the system controller 131.

In a case where the pupil area is determined not to have been detected in step S24, the process proceeds to step S26.

In step S26, the area setting unit 213 sets the focus frame or the face area detected by the person detection unit 212-1 as a focus area. Information associated with the set focus area is output to the system controller 131.

Furthermore, in a case where it is determined in step S20 that the shutter button has not been pressed halfway or the AF-ON button has not been pressed, the process proceeds to step S27.

In step S27, the area setting unit 213 sets the face area detected by the person detection unit 212-1 as a focus area. Information associated with the set focus area is output to the system controller 131.

In step S28, the display control unit 214 generates a face preliminary-notice frame in the face area detected by the person detection unit 212-1, superimposes the face preliminary-notice frame on the live view image, and causes the display unit 141 to display it.

Figure 11:
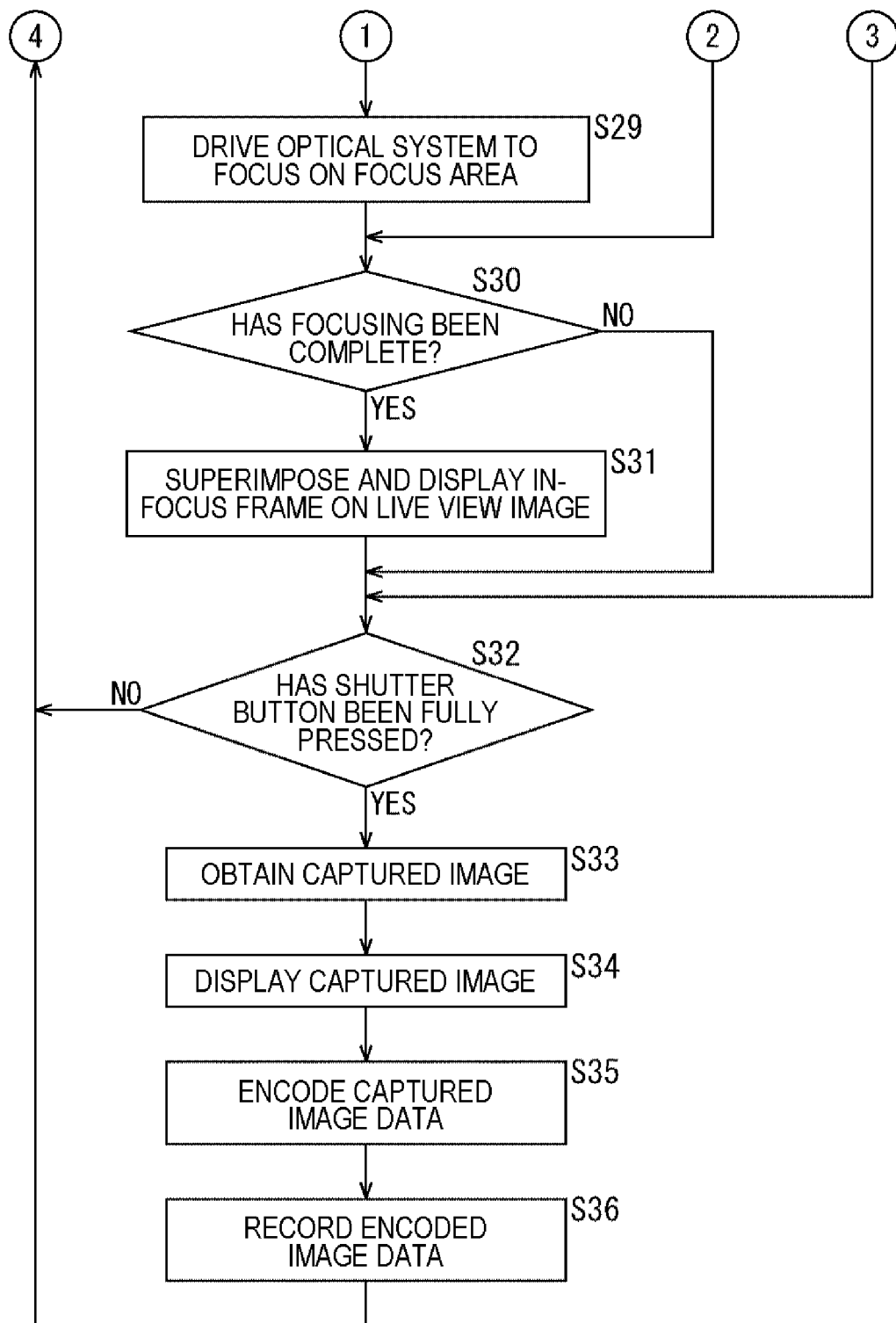
FIG. 11 is a flowchart illustrating the imaging process in the human pupil detection mode continuing from FIG. 10.

Subsequent to steps S19, S20, and S25, the process proceeds to step S29 of FIG. 11.

In step S29, the system controller 131 controls the lens driver 121 to drive an optical system such as the lens 101 and the diaphragm 102 in such a manner that the focus area is in focus. Thereafter, the process proceeds to step S30.

The process also proceeds to step S30 subsequent to step S27 of FIG. 11.

In step S30, the system controller 131 determines whether or not the focusing has been complete.

In a case where the focusing is determined to have been complete in step S30, the process proceeds to step S31.

In step S31, the display control unit 214 causes the display unit 141 to display an image based on the image data stored in the memory 211 as a live view image. Furthermore, the display control unit 214 superimposes an in-focus frame (pupil frame, face frame, or focus frame), which is a frame surrounding the set focus area, on the live view image, and causes the display unit 141 to display it.

In a case where the focusing is determined not to have been complete in step S30, the process skips step S31 and proceeds to step S32.

Furthermore, the process proceeds to step S32 subsequent to step S29 of FIG. 10.

In step S32, the system controller 131 determines whether or not the shutter button has been fully pressed on the basis of the signals corresponding to the operation input from the operation unit 146. In a case where the shutter button is determined to have been fully pressed in step S32, the process proceeds to step S33.

In step S33, the imaging element 103 photoelectrically converts the light from the subject collected through the optical system such as the lens 101 and the diaphragm 102 in pixel units to obtain an electric signal of each pixel of the image. An image signal, which is an electric signal of each pixel of the image, is output to the memory 211 of the digital signal processing unit 106 via the analog signal processing unit 104 and the A/D converter 105.

In step S34, the display control unit 214 causes the display unit 141 to display an image based on the image data stored in the memory 211 as a captured image.

In step S35, the codec processing unit 215 encodes the image data stored in the memory 211. The codec processing unit 215 supplies the encoded image data to the storage 142.

In step S36, the codec processing unit 215 causes the storage 142 to record the encoded image data. Thereafter, the process returns to step S11, and the subsequent processing is repeated.

Furthermore, also in a case where the shutter button is determined not to have been fully pressed in step S32, the process returns to step S11, and the subsequent processing is repeated.

Figure 12:
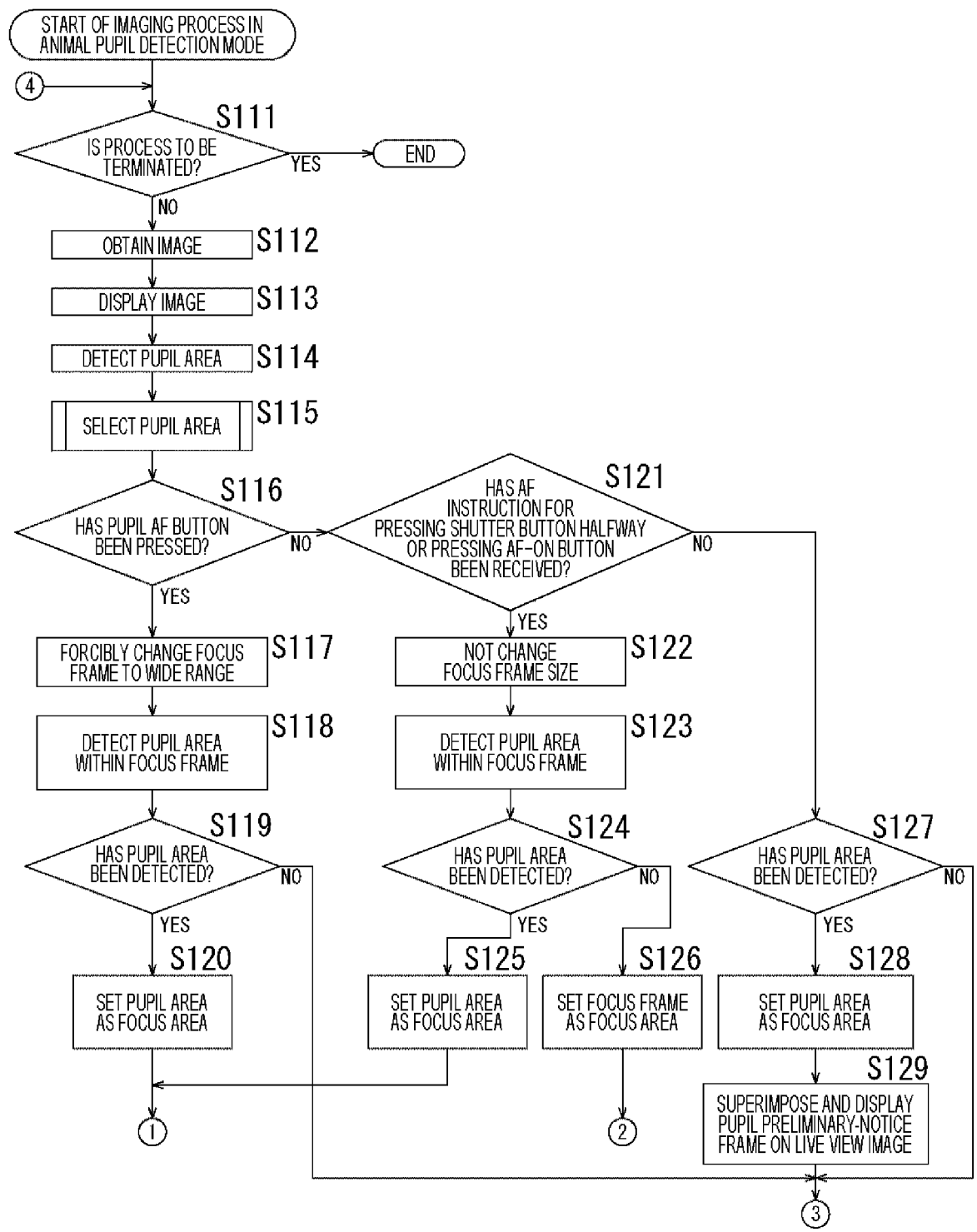
FIG. 12 is a flowchart illustrating an imaging process in the animal pupil detection mode.

FIG. 12 is a flowchart illustrating an imaging process of the imaging device 100 in the animal pupil detection mode.

The imaging process in the animal pupil detection mode of FIG. 12 starts when the power is turned on by the power button being operated, for example. An animal pupil detection mode is set in advance as a detection mode for each specific part of the subject from a setting screen or the like. FIG. 12 illustrates an exemplary case where the animal detection unit 212-2 that detects a pupil of a cat or a dog detects a pupil of an animal.

In step S111 of FIG. 12, the system controller 131 determines whether or not to terminate the process, for example, whether or not the power button has been operated.

In a case where the process is determined to be terminated in step S111, the imaging process is terminated.

In a case where the process is determined not to be terminated in step S111, the process proceeds to step S112.

In step S112, the imaging element 103 photoelectrically converts the light from the subject collected through the lens 101 and the diaphragm 102 in pixel units to obtain an electric signal of each pixel of the image. An image signal, which is an electric signal of each pixel of the image, is output to the memory 211 of the digital signal processing unit 106 via the analog signal processing unit 104 and the A/D converter 105.

In step S113, the display control unit 214 causes the display unit 141 to display an image based on the image data stored in the memory 211 as a live view image.

In step S114, the animal detection unit 212-2 detects a pupil area from the image data stored in the memory 211. The animal detection unit 212-2 supplies information associated with the detected pupil area to the area setting unit 213 and the display control unit 214.

In step S115, the display control unit 214 performs processing of selecting the pupil area detected by the animal detection unit 212-2. According to the processing of selecting the pupil area, a pupil area in which a preliminary-notice frame is displayed is selected from a plurality of the detected pupil areas.

In step S116, the system controller 131 determines whether or not the user has pressed the pupil AF button.

In a case where the pupil AF button is determined to have been pressed in step S116, the process proceeds to step S117.

In step S117, the system controller 131 forcibly changes the focus frame to a wide range.

In step S118, the animal detection unit 212-2 detects a pupil area within the focus frame changed to the wide range under the control of the system controller 131. Information associated with the detected pupil area is output to the area setting unit 213 and the display control unit 214.

In step S119, the area setting unit 213 determines whether or not the pupil area has been detected. In a case where the pupil area is determined to have been detected in step S119, the process proceeds to step S120.

In step S120, the area setting unit 213 sets the pupil area detected by the animal detection unit 212-2 as a focus area. Information associated with the set focus area is supplied to the system controller 131.

Meanwhile, in a case where the pupil AF button is determined not to have been pressed in step S116, the process proceeds to step S121.

In step S121, the system controller 131 determines whether or not the user has pressed the shutter button halfway or whether or not the user has pressed the AF-ON button.

In a case where it is determined in step S121 that the shutter button has been pressed halfway or the AF-ON button has been pressed, the process proceeds to step S122.

In step S122, the system controller 131 does not change the focus frame.

In step S123, the animal detection unit 212-2 detects a pupil area within the focus frame under the control of the system controller 131. Information associated with the detected pupil area is output to the area setting unit 213 and the display control unit 214.

In step S124, the area setting unit 213 determines whether or not the pupil area has been detected. In a case where the pupil area is determined to have been detected in step S124, the process proceeds to step S125.

In step S125, the area setting unit 213 sets the pupil area detected by the animal detection unit 212-2 as a focus area. Information associated with the set focus area is supplied to the system controller 131.

In a case where the pupil area is determined not to have been detected in step S125, the process proceeds to step S126.

In step S126, the area setting unit 213 sets the focus frame as a focus area as another condition. Information associated with the set focus area is output to the system controller 131.

Furthermore, in a case where it is determined in step S121 that the shutter button has not been pressed halfway or the AF-ON button has not been pressed, the process proceeds to step S127.

In step S127, the area setting unit 213 determines whether or not the pupil area has been detected. In a case where the pupil area is determined to have been detected in step S127, the process proceeds to step S128.

In step S128, the area setting unit 213 sets the pupil area detected by the animal detection unit 212-2 as a focus area. Information associated with the set focus area is supplied to the system controller 131.

In step S129, the display control unit 214 generates a pupil preliminary-notice frame in the pupil area detected by the animal detection unit 212-2, superimposes the pupil preliminary-notice frame on the live view image, and causes the display unit 141 to display it.

Figure 13:
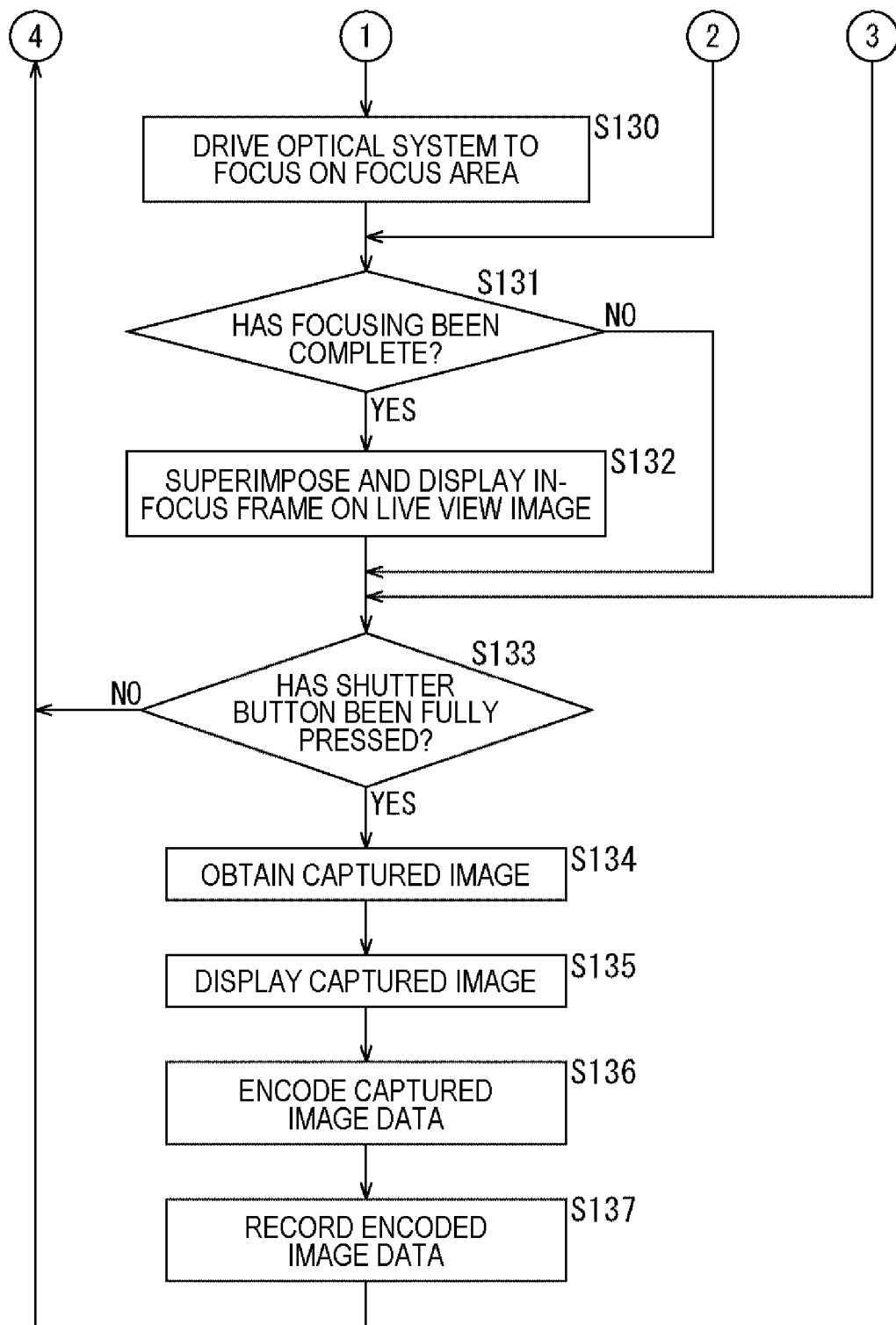
FIG. 13 is a flowchart illustrating the imaging process in the animal pupil detection mode continuing from FIG. 12.

Subsequent to steps S120 and S125, the process proceeds to step S130 of FIG. 13.

In step S130, the system controller 131 controls the lens driver 121 to drive the optical system such as the lens 101 and the diaphragm 102 in such a manner that the focus area is in focus. Thereafter, the process proceeds to step S131.

The process also proceeds to step S131 subsequent to step S126 of FIG. 12.

In step S131, the system controller 131 determines whether or not the focusing has been complete.

In a case where the focusing is determined to have been complete in step S131, the process proceeds to step S132.

In step S132, the display control unit 214 causes the display unit 141 to display an image based on the image data stored in the memory 211 as a live view image. Furthermore, the display control unit 214 superimposes an in-focus frame (pupil frame or focus frame), which is a frame surrounding the set focus area, on the live view image, and causes the display unit 141 to display it.

In a case where the focusing is determined not to have been complete in step S131, the process skips step S132 and proceeds to step S133.

Furthermore, in a case where the pupil area is determined not to have been detected in step S119 or S127 of FIG. 12, the focusing is not performed, and the process proceeds to step S133 of FIG. 13. The process also proceeds to step S133 subsequent to step S129.

In step S133, the system controller 131 determines whether or not the shutter button has been fully pressed on the basis of the signals corresponding to the operation input from the operation unit 146. In a case where the shutter button is determined to have been fully pressed in step S133, the process proceeds to step S134.

In step S134, the imaging element 103 photoelectrically converts the light from the subject collected through the optical system such as the lens 101 and the diaphragm 102 in pixel units to obtain an electric signal of each pixel of the image. An image signal, which is an electric signal of each pixel of the image, is output to the memory 211 of the digital signal processing unit 106 via the analog signal processing unit 104 and the A/D converter 105.

In step S135, the display control unit 214 causes the display unit 141 to display an image based on the image data stored in the memory 211 as a captured image.

In step S136, the codec processing unit 215 encodes the image data stored in the memory 211. The codec processing unit 215 supplies the encoded image data to the storage 142.

In step S137, the codec processing unit 215 causes the storage 142 to record the encoded image data. Thereafter, the process returns to step S111, and the subsequent processing is repeated.

Furthermore, also in a case where the shutter button is determined not to have been fully pressed in step S133, the process returns to step S111, and the subsequent processing is repeated.

Note that, in the process described above, descriptions have been given such that the focusing processing is not executed or the focusing processing is executed under other conditions such as the focus frame in a case where the pupil area has not been detected. The operation in a case where the pupil area has not been detected may be performed properly according to the setting made by the user or the like. At that time, the operation in the case of not having been detected may be changed depending on the target subject or specific part that has not been detected.

For example, by performing the setting such that the focusing processing is not carried out in the case of not having been detected, it becomes possible to suppress further deterioration of the focusing precision in a case where motion of the target subject or specific part is small. On the other hand, by performing the setting such that the focusing processing is carried out at the position instructed by the user in the case of not having been detected, it becomes possible to perform preliminary focusing processing in a case where motion of the target subject or specific part is large.

Figure 14:
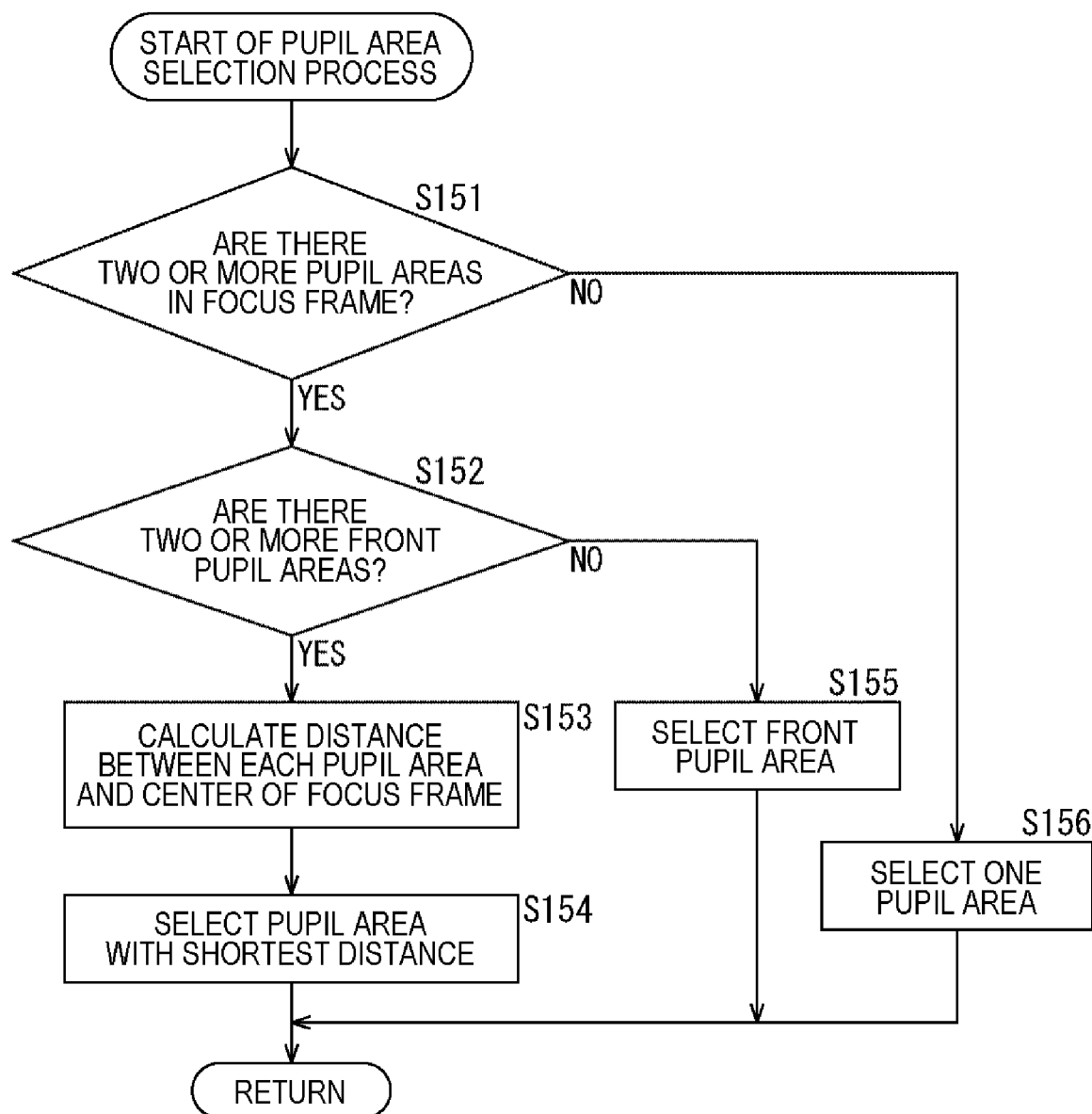
FIG. 14 is a flowchart illustrating a pupil area selection process in step S114 of FIG. 12.

FIG. 14 is a flowchart illustrating the pupil area selection process in step S114 of FIG. 12.

In step S151, the display control unit 214 determines whether or not there are two or more pupil areas in the focus frame. For example, in a case where two animals are present at a position on the near side of the imaging device 100, pupils of the number of any of one to four may be detected.

In a case where it is determined in step S151 that there are two or more pupil areas in the focus frame, the process proceeds to step S52.

In step S152, the display control unit 214 determines whether or not there are two or more front pupil areas.

In a case where it is determined in step S152 that there are two or more front pupil areas, the process proceeds to step S153.

In step S153, the display control unit 214 calculates a distance between each pupil area and the center of the focus frame.

In step S154, the display control unit 214 selects the pupil area having the shortest distance from the center of the focus frame.

On the other hand, in a case where it is determined in step S151 that there are not two or more detected pupil areas in the focus frame, the process proceeds to step S155.

In step S155, the display control unit 214 selects one pupil area.

Furthermore, in a case where it is determined in step S152 that there are not two or more front pupil areas, the process proceeds to step S156.

In step S156, the display control unit 214 selects the front pupil area.

Subsequent to steps S154 to S156, the pupil area selection process is terminated, and the process returns to step S114 of FIG. 12.

As described above, according to the present technology, a preliminary-notice frame that gives notice of a specific area to be focused is displayed on the image obtained by the imaging unit according to a type of the subject.

For example, in a case where the preliminary-notice frame is not displayed, the user performs an operation for instructing a start of focusing to carry out automatic focusing and imaging, which may lead to a result unintended by the user depending on conditions of the subject.

According to the present technology, with the preliminary-notice frame displayed, it is known in advance that the intended position or an unintended position has been detected, whereby the user is enabled to select not performing automatic focusing.

As described above, the user can easily focus on a specific part such as a pupil area or an animal itself according to the animal that is a type of the subject.

Note that, while the process of detecting a pupil of an animal, such as a dog and cat, has been described in the descriptions above, the present technology can be applied to a specific part of a subject, such as a pupil, face, part of a face, neck, and head of all forms of life, such as birds, fish, reptiles, and amphibians, or the entire body (subject). Furthermore, the present technology can also be applied to combinations of those specific parts of the subject or the subjects.

Moreover, the present technology can be applied not only to a living being but also to a specific part of a subject such as a headlight, front emblem, front window, or driver seat of a vehicle, or a headlight or helmet of a motorcycle.

In those cases, a detection mode for detecting a specific part of the subject is preset and used. With this arrangement, it becomes possible to give, to the imaging device, the user's intention such as which detection result or detection method is prioritized among a plurality of detection results or detection methods, or which subject is prioritized among a plurality of subjects.

Note that, unlike the case of a person, in the case of an animal having long hair, hair on a pupil may be focused instead of the pupil in an attempt to focus on the pupil. In this case, the position of the focal point is adjusted to the rear, or the imaging device is set in advance that the subject is likely to be in focus on the hair and the imaging device performs control on the basis of the setting, whereby an imaging result more suitable for the user's intention can be obtained.

However, even in the case of a subject having short hair, performing the same control may result in an out-of-focus state. Therefore, it becomes possible to further improve the convenience by adjusting what type of adjustment is to be reflected using a subject or specific part to be detected and other detection results.

Note that, while a pupil of a person and a pupil of an animal are detected by different detection processes in the descriptions above, a pupil of a person may also be detected by the detection process same as a pupil of an animal.

Furthermore, the series of processing described above can be executed by hardware or by software. In a case where the series of processing described above is executed by software, a program constituting the software is installed from a network or a recording medium.

As illustrated in FIG. 5, for example, the recording medium includes the removable recording medium 148 on which the program is recorded, which is distributed to deliver the program to the user separately from the device main body. The removable recording medium 148 includes a magnetic disk (including a flexible disk) and an optical disk (including a CD-ROM and a DVD). Moreover, a magneto-optical disc (including a mini disc (MD)), a semiconductor memory, and the like are also included.

In this case, the program may be installed in the storage 142 by the removable recording medium 148 mounted in the drive 147.

Furthermore, the program may also be provided through a wired or wireless transmission medium such as a local area network, the Internet, and digital satellite broadcasting. In this case, the program may be received via the communication unit 145, and may be installed in the storage 142.

In addition, the program may be installed in advance in the storage 142, a read only memory (ROM) in the system controller 131, or the like.

Note that the program to be executed by the computer may be a program in which processing is executed in a time-series manner according to the order described in the present specification, or may be a program in which processing is executed in parallel or at a necessary timing such as a calling is performed.

Note that, in the present specification, a system indicates a set of a plurality of constituent elements (devices, modules (parts), etc.), and it does not matter whether or not all the constituent elements are in the same housing. Therefore, a plurality of devices housed in separate housings and connected through a network, and one device in which a plurality of modules is housed in one housing are both systems.

An embodiment of the present technology is not limited to the embodiment described above, and various modifications can be made without departing from the gist of the present technology.

For example, the present technology may employ a configuration of cloud computing in which one function is shared and jointly processed by a plurality of devices via a network.

Furthermore, each step described in the flowcharts described above may be executed by one device or shared by a plurality of devices.

Moreover, in a case where a plurality of processes is included in one step, the plurality of processes included in the one step may be executed by one device or shared by a plurality of devices.

Note that the effects described herein are merely examples and not limited, and additional effects may be included.

<Exemplary Configuration Combination>

The present technology may also employ the following configurations.

(1) An imaging device including a display control unit that causes a preliminary-notice frame that gives notice of a specific area to be focused to be displayed on an image obtained by an imaging unit according to a type of a subject.

(2) The imaging device according to (1) described above, in which
the subject includes a person or an animal.

(3) The imaging device according to (1) described above, in which
the subject can be preset.

(4) The imaging device according to any one of (1) to (3) described above, in which
the specific area includes an area of a specific part of the subject.

(5) The imaging device according to (4) described above, in which
the specific part includes a pupil.

(6) The imaging device according to (1) described above, in which
the specific area includes an area of the subject.

(7) The imaging device according to any one of (1) to (6) described above, further including:
an area detection unit that detects the specific area, in which
in a case where a plurality of the specific areas has been detected, the display control unit controls display of the preliminary-notice frame according to a focus setting frame for setting a focus area.

(8) The imaging device according to (7) described above, in which
the display control unit controls the display of the preliminary-notice frame according to the specific area closer to a center position of the focus setting frame.

(9) The imaging device according to (7) or (8) described above, further including:
a focus instruction unit that provides an instruction for starting focusing in a unit of capturing of the image; and
an area setting unit that sets the detected specific area as a focus area of the image in a case where the instruction for starting focusing is provided.

(10) The imaging device according to (9) described above, in which
the area setting unit sets the specific area detected within a predetermined range as the focus area.

(11) The imaging device according to (9) described above, in which
the area setting unit sets the specific area detected within a predetermined range indicated by the focus setting frame as the focus area.

(12) The imaging device according to any one of (9) to (11) described above, in which
in a case where the area setting unit sets the focus area, the display control unit controls display of a focus area frame indicating the focus area in place of the display of the preliminary-notice frame.

(13) The imaging device according to (9) described above, in which
the display control unit controls the display of the focus area frame using a display method different from the display of the preliminary-notice frame.

(14) The imaging device according (9) described above, in which the area setting unit sets the specific area detected within a predetermined range indicated by the focus setting frame as the focus area.

(15) The imaging device according to any one of (6) to (10) described above, further including:
an imaging instruction unit that provides an instruction for imaging; and
a focus control unit that controls the imaging unit to perform the focusing in the focus area set by the area setting unit to obtain the image in a case where the imaging is instructed.

(16) An imaging method including:
causing, by an imaging device, a preliminary-notice frame that gives notice of a specific area to be focused to be displayed on an image obtained by an imaging unit according to a type of a subject.

(16) A program causing a computer to function as:
a display control unit that causes a preliminary-notice frame that gives notice of a specific area to be focused to be displayed on an image obtained by an imaging unit according to a type of a subject.

REFERENCE SIGNS LIST

100 Imaging device
101 Lens
102 Diaphragm
103 Imaging element
104 Analog signal processing unit
105 A/D converter
106 Digital signal processing unit
121 Lens driver
131 System controller
141 Display unit
142 Storage 146 Operation unit
211 Memory
212 Subject detection unit
212-1 Person detection unit
212-2 Animal detection unit
212-3 Animal detection unit
213 Area setting unit
214 Display control unit
215 Codec processing unit

The invention claimed is:

1. An imaging apparatus, comprising:
an imager configured to acquire an image; and
circuitry configured to:
set a face area of a human as a first type of in-focus area of the image,
set a pupil area of the human as a second type of in-focus area of the image,
set a pupil area of a cat or dog as a third type of in-focus area of the image,
enter an animal pupil detection mode that is distinct from a human pupil detection mode, and
in the animal pupil detection mode, in an absence of receiving indication of pressing of a physical button for autofocus or a start of pupil focusing, superimposing a pupil preliminary notice frame corresponding to the pupil area of the cat or dog.

2. The imaging apparatus according to claim 1, wherein the circuitry is further configured to omit setting a face area of the cat or dog as an additional in-focus area of the image in the human pupil detection mode.

3. The imaging apparatus according to claim 1, wherein the circuitry is further configured to control a display unit to display a notice frame that gives notice of a specific area to be focused on the image.

4. The imaging apparatus according to claim 3, wherein the notice frame surrounds the face area of the human, the pupil area of the human or the pupil area of the cat or dog based on a setting.

5. The imaging apparatus according to claim 1, wherein the circuitry is further configured to set the pupil area of the cat or dog as a selected in-focus area of the image based on receiving indication of a pressing of the physical button for autofocus or the start of pupil focusing.

6. The imaging apparatus according to claim 5, wherein the physical button is an autofocus button.

7. The imaging apparatus according to claim 5, wherein the physical button is a dedicated button for instructing the start of pupil focusing.

8. A non-transitory computer readable medium storing program code, the program being executable to perform operations comprising:
receiving an image captured by an imager;
setting a face area of a human as a first type of in-focus area of the image;
setting a pupil area of the human as a second type of in-focus area of the image;
setting a pupil area of a cat or dog as a third type of in-focus area of the image;
enter an animal pupil detection mode that is distinct from a human pupil detection mode; and
in the animal pupil detection mode, in an absence of receiving indication of pressing of a physical button for autofocus or a start of pupil focusing, superimposing a pupil preliminary notice frame corresponding to the pupil area of the cat or dog.

9. The non-transitory computer readable medium according to claim 8, wherein the operations further comprise:
omitting a setting of a face area of the cat or dog as an additional in-focus area of the image in the human pupil detection mode.

10. The non-transitory computer readable medium according to claim 8, wherein the operations further comprise:
controlling a display unit to display a notice frame that gives notice of a specific area to be focused on the image.

11. The non-transitory computer readable medium according to claim 10, wherein the notice frame surrounds the face area of the human, the pupil area of the human or the pupil area of the cat or dog based on a setting.

12. The non-transitory computer readable medium according to claim 8, wherein the operations further comprise:
setting the pupil area of the cat or dog as a selected in-focus area of the image based on receiving indication of the pressing of the physical button for autofocus or the start of pupil focusing.

13. The non-transitory computer readable medium according to claim 12, wherein the physical button is an autofocus button.

14. The non-transitory computer readable medium according to claim 12, wherein the physical button is a dedicated button for instructing the start of pupil focusing.

15. A method comprising:
receiving an image captured by an imager;
setting a face area of a human as a first type of in-focus area of the image;
setting a pupil area of the human as a second type of in-focus area of the image;
setting a pupil area of a cat or dog as a third type of in-focus area of the image;
enter an animal pupil detection mode that is distinct from a human pupil detection mode; and
in the animal pupil detection mode, in an absence of receiving indication of pressing of a physical button for autofocus or a start of pupil focusing, superimposing a pupil preliminary notice frame corresponding to the pupil area of the cat or dog.

16. The method according to claim 15, further comprising:
omitting a setting of a face area of the cat or dog as an additional in-focus area of the image in the human pupil detection mode.

17. The method according to claim 15, further comprising:
controlling a display unit to display a notice frame that gives notice of a specific area to be focused on the image.

18. The method according to claim 17, wherein the notice frame surrounds the face area of the human, the pupil area of the human or the pupil area of the cat or dog based on a setting.

19. The method according to claim 15, further comprising:
setting the pupil area of the cat or dog as a selected in-focus area of the image based on receiving indication of a pressing of the physical button for autofocus or for the start of pupil focusing.

20. The method according to claim 19, wherein the physical button is an autofocus button.

21. The method according to claim 19, wherein the physical button is a dedicated button for instructing the start of pupil focusing.

* * * * *